Patented Oct. 24, 1950

2,526,873

UNITED STATES PATENT OFFICE 2,526,873

PREPARATION OF GREEN COFFEE

William R. Johnston, Bronxville, and Herbert Elliott Foote, New York, N. Y., assignors to Standard Brands Incorporated, New York, N. Y., a corporation of Delaware No Drawing. Application June 7, 1949, Serial No. 97,706

7 Claims. (Cl. 99—65)

This invention relates to an improved process for preparing green coffee from the coffee cherry and more particularly to an improved process for the removal of the residual pulp (mucilage) of pulped coffee beans.

The best coffees of commerce are prepared by the wet process. In this process the coffee cherries after washing are passed through a pulping machine to remove the skin and about 80% of the pulp, and then the resulting pulped beans are subjected to spontaneous fermentation until the residual pulp can be washed from the parchment integument which encases each green bean. The washed beans in parchment are dried in the sun or in a mechanical drier and finally the parchment is removed in a shelling machine. The beans are then ready for roasting.

This fermentation method has two disadvantages in that a lengthy digestion period is required before the pulp is loosened sufficiently to be removable by washing, and during this period, fermentation by-products are absorbed by the coffee beans and may deleteriously affect the flavor of the roasted bean particularly if the fermentation is not conducted properly.

In accordance with the invention, these disadvantages are avoided by digesting the pulp with a pectic enzyme preparation. The pectic enzymes hydrolyse the materials forming the pulp, thereby softening it to such an extent that it may be readily removed thereafter by washing without the use of special machinery. In this way, the pulp may be removed much faster than by the spontaneous fermentation process and spontaneous fermentation may be avoided completely or reduced to a minimum. The process may also be applied to hasten digestion of pulped beans which have already undergone some fermentation. The best procedure is to process the cherries and obtain the dry beans before any fermentation can set in.

Pectic enzyme preparations derived from any source are suitable for carrying out the process. They contain more than one enzyme but it is probable that the one which is most effective in the process of the invention is pectinase. We prefer to use the pectic enzyme preparations obtained from mold fungi.

The pectic enzymes may be applied to the pulped beans either in an aqueous solution or, preferably, as a dry powder to give maximum concentration on the pulp. The powder is thoroughly mixed with the wet pulped beans and dissolves in the water present within and upon the pulped beans. The use of an inert filler, such as starch, with the enzyme will help to distribute it throughout the mass.

The rate of digestion depends upon the pH of the medium, the temperature, the enzyme concentration and the degree of agitation. In general, the rate of digestion increases with increase in temperature, up to approximately 60° C. The optimum temperatures are between 50 and 60° C. Temperatures above 60° C. appear to inactivate the enzyme system. The optimum pH is about 3.5, although the unadjusted pH of coffee pulp of about 5.3 gives satisfactory results.

Agitation of the mixture of enzymes and pulped coffee beans not only increases the rate of digestion but also leads to a more efficient utilization of the enzymes, thus permitting use of a smaller amount for a given weight of cherries. Treatment with 0.1% of a pectic enzyme preparation based on the wet weight of the pulped beans combined with vigorous agitation resulted in complete digestion of the pulp in twenty minutes. Static digestion with the same amount of the same enzyme required approximately three hours. Agitation removes hydrolyzed layers as they become loosened, and thus continuously supplies a fresh surface of the pulp for enzyme attack and eliminates the necessity for the enzyme to diffuse through hydrolyzed layers to the unhydrolyzed substrata. The rate of diffusion through these layers largely governs the rate of digestion under static conditions.

The amount of enzyme employed will depend upon the above mentioned conditions of temperature, concentration, pH and agitation. As little as 0.025% of the enzyme by weight of the pulped beans has been found to be effective when added in dry form. In general, upwards of 0.05% is employed so as to give 100% pulp removal in a digestion period of five hours or less. After the process is complete, the enzyme solution may be drained from the beans and may be re-used at least once in the interest of economy.

The following examples illustrate several methods of application of the invention:

Example 1

In order to determine the effect of enzyme concentration on the rate of digestion, 10-gram lots of pulped coffee beans were each treated with 10 cc. of solutions of the same pectic enzyme of varying concentrations. The time required to give 100% digestion of the pulp for the amount of enzyme used is given in the following table:

| Concentration of Enzyme Solution (Per cent by weight) | Digestion Time (Hours) |
|---|---|
| 10.0 | 0.75 |
| 1.0 | 2.0 |
| 0.5 | 2.4 |
| 0.4 | 4.0 |
| 0.25 | 6.0 |
| 0.08 | over 8 |

The pulped beans were swirled about once every minuted. The digestion in all cases was conducted at 29.5° C.

These results show that with a 0.25% solution of the enzyme the digestion time was six hours. It is desirable to conduct the process so that the digestion time is less than eight hours in order to avoid fermentation during the process. While minimum digestion time is desirable, the expense of the enzyme preparation may require use of less concentrated solutions.

*Example 2*

The influence of temperature on the digestion time was determined by treating 10-gram lots of pulped beans with 10 cc. of 0.6% and 1% solutions of the same pectic enzyme at 31° and 38° C. The digestion times noted for each lot are given in the following table:

| Percent Concentration of Enzyme Solution | Digestion Temperature °C. | Digestion Time (Hours) |
|---|---|---|
| 1.00 | 38 | 1.37 |
| 1.00 | 31 | 2.10 |
| 0.60 | 38 | 1.83 |
| 0.60 | 31 | 2.40 |

*Example 3*

A batch of ripe coffee cherries was washed, drained and then passed through a pulping machine which removed the skin and most of the pulp leaving the beans with a mucilaginous covering. These pulped beans were divided into three lots of equal weight which were thoroughly mixed for 5 minutes in a scrubber with 0.05% of enzyme in one case, 0.05% of enzyme and 1.0% cornstarch in another case, and 0.025% of enzyme and 1.0% cornstarch in the third case. The same enzyme preparation was used in each case. The mixtures were allowed to stand and undergo digestion at 30° C. Samples were taken from each lot after 1, 3, 5 and 8 hours. Each sample was washed and dried and the degree of mucilage removal noted. It was found that there was complete removal of mucilage in 3 to 5 hours in the case of the first two lots, using 0.05% by weight of the enzyme, and in 5 to 8 hours in the case of the last lot using 0.025% of the enzyme.

In this example dry pectic enzyme was used as contrasted with a pectic enzyme solution in Example 1.

We use the term "fermentation" herein to mean microbial fermentation.

We claim:
1. In a process of preparing green coffee from coffee cherries, the step of treating pulped coffee beans with a preparation of pectic enzymes until the pulp is loosened.
2. Process in accordance with claim 1 which is completed without substantial fermentation.
3. Process in accordance with claim 1 which includes agitating the beans periodically during the treatment with the enzymes.
4. Process in accordance with claim 1 in which the treatment is conducted at temperatures between 50° and 60° C.
5. Process in accordance with claim 1 in which the pH of the pulped beans is approximately 3.5.
6. In a process of preparing green coffee from coffee cherries, the steps which comprise treating pulped coffee beans with pectinase until the pulp is loosened and separating said loosened pulp.
7. Process for removing residual pulp from pulped coffee beans which comprises treating the same with a preparation of pectic enzymes until the residual pulp is loosened, removing the loosened pulp by washing and then drying the washed beans.

WILLIAM R. JOHNSTON.
HERBERT ELLIOTT FOOTE.

REFERENCES CITED

The following references are of record in the file of this patent:

UNITED STATES PATENTS

| Number | Name | Date |
|---|---|---|
| 1,737,071 | Birnie | Nov. 26, 1929 |
| 2,321,148 | Kirby | June 8, 1943 |